Dec. 25, 1951    K. BERLEKAMP    2,579,537
LICENSE PLATE REINFORCEMENT SIGN
Filed May 16, 1949

KENNETH BERLEKAMP
Inventor
By Geo E Kirk
Atty.

Patented Dec. 25, 1951

2,579,537

UNITED STATES PATENT OFFICE 2,579,537

LICENSE PLATE REINFORCEMENT SIGN

Kenneth Berlekamp, Fremont, Ohio

Application May 16, 1949, Serial No. 93,500

1 Claim. (Cl. 40—125)

This invention relates to sheet structures including display-providing body portions.

This invention has utility assembled with motor vehicle license plates.

Referring to the drawings.

Figure 1:
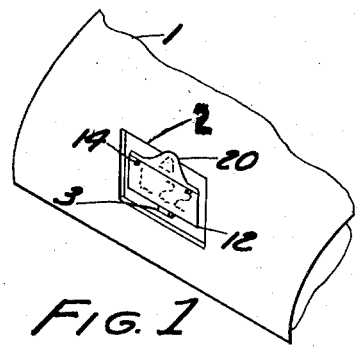
Fig. 1 is a fragmentary view in perspective of a countersunk seat for a license plate carrying or holding bracket, with an upwardly directed secondary plate assembled therewith.
Figure 3:
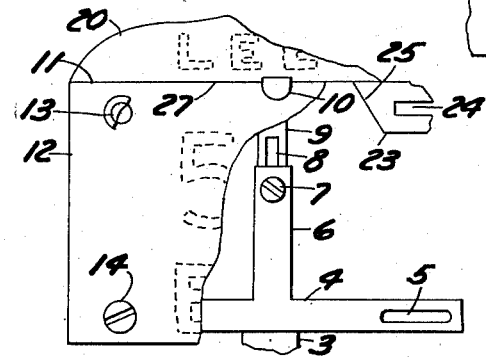
Fig. 3 is a view looking toward a license plate bracket, with a fragment of the plate and the sign reinforcement.
Figure 5:
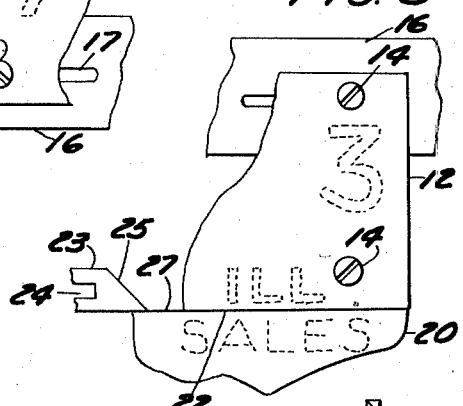
Fig. 5 shows a similar bumper to that of Fig. 4, but with the license plate depending and the advertisement plate at the bottom.
Figure 6:
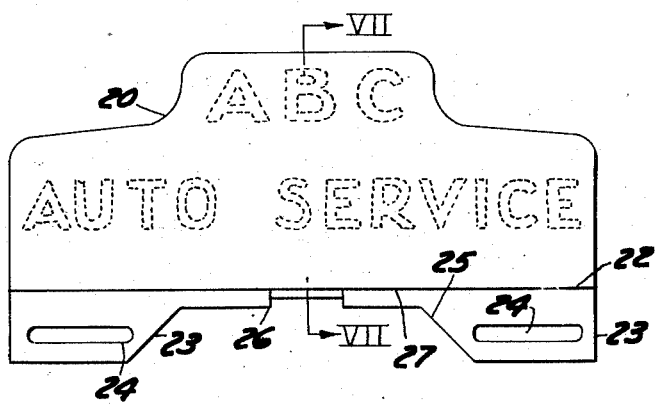
Fig. 6 is a front view of an embodiment of the sign or secondary plate in its lengthwise reinforcement and weather-shield details.
Figure 7:
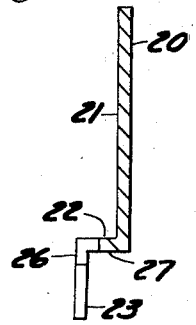
Fig. 7 is a section on the line VII—VII, Fig. 6, showing the offset or reinforcement.

A passenger car type of automobile, having a trunk section lid 1 (Fig. 1), is shown with a countersunk seat 2, in which is a bracket 3. The bracket 3 includes a horizontally extending rigid strap or bar portion 4 with bolt-receiving slots 5 extending inward from adjacent its ends. Medially, there is an upstanding stem 6 from the bracket 3. The stem 6 mounts a bolt 7 extending thru a slot 8 in a relatively upwardly shiftable strap or tongue 9 having a bent-back end tip or hook 10 adapted to clamp down over a top edge 11 of a license or primary plate 12. The plate 12, adjacent its corners, has openings 13. Mounting bolts 14 thru openings 13 in register with slots 5 provide a normal mounting for a primary or license plate 12 (Fig. 3).

Figure 2:
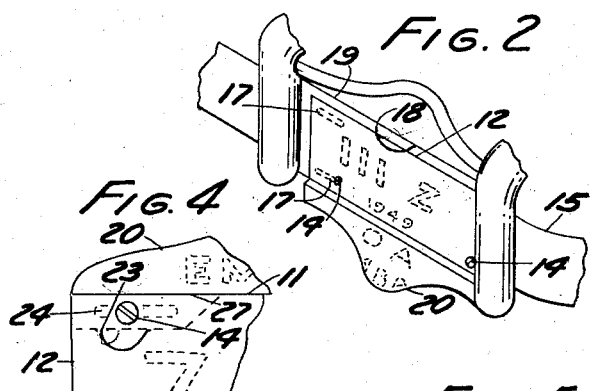
Fig. 2 shows a portion of an automobile bumper as a carrier for a license plate, with a secondary plate depending therefrom.
Figure 4:
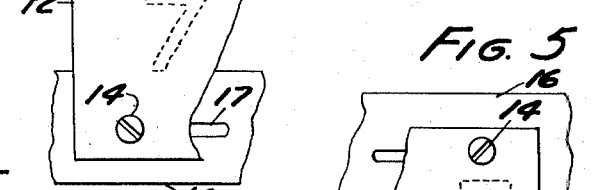
Fig. 4 shows a section of an automobile bumper with a portion of the primary or license plate rising therefrom to carry at its top a sign reinforcement.

Automobile bumpers 15, 16, may have variously located slots 17, adapted to coact similarly to the slots 5 of the bracket 3. The bumper 15 has an overhang 18 as to a license plate seat 19 (Fig. 2) in which a license plate 12 is anchored by bolts 14.

The sign or secondary plate may carry supplemental information beyond that displayed by the primary or license plate. This may be as to automobile club membership, insurance, county or city of owner's residence, name of car owner, or automobile dealer, or one giving servicing attention to such car.

The secondary plate, herein adopted as of sheet metal, preferably sheet steel in the range of #20 gage, is shown with a front side 20, which may carry the informative matter, and a rear side 21. These faces 20, 21, extend from an offset or ledge 22 to end legs 23, having bolt-receiving slots 24. A spacing 25 between the legs 23 may be to a medially notched portion 26 providing seat-way for a tongue 9 and tip 10. The side of the offset 22 between the plane of the display side 20 and the legs 23 provides a seat 27 in which may nest the long edge of the license plate 12 for the full length of the plate face 20, serving as an effective stiffening or reinforcement between the corner openings 13 in the plate 12.

What is claimed and it is desired to secure by Letters Patent is:

An attachment for a license plate having a lengthwise edge and a bolt opening in proximity to each end of said edge and bolts for the openings, said attachment comprising an integral sheet structure including a display-providing body portion bounded on one side by an offset, a U-shaped portion providing a pair of legs, one leg being near each end of the offset, said legs extending away from the display-providing body portion in a plane parallel to the plane of the display-providing body portion at a spacing determined by said offset, and in each leg a slot, said slots being in alignment, spaced from and parallel to the offset in the range of the plate bolt openings from the edge of the plate, whereby said bolts in passing thru the slots and openings position the plate lengthwise edge in register with the offset in reinforcing shield coaction between the plate and sheet structure.

KENNETH BERLEKAMP.

REFERENCES CITED

The following references are of record in the file of this patent:

UNITED STATES PATENTS

| Number | Name | Date |
| --- | --- | --- |
| 1,498,889 | Snell | June 24, 1924 |
| 1,651,126 | Ingalls | Nov. 29, 1927 |
| 1,852,375 | Read | Apr. 5, 1932 |
| 1,887,087 | Frizner | Nov. 8, 1932 |
| 2,093,620 | Roessler | Sept. 21, 1937 |
| 2,146,113 | Erickson | Feb. 7, 1939 |